(12) United States Patent
Anderson

(10) Patent No.: US 11,696,527 B2
(45) Date of Patent: Jul. 11, 2023

(54) MULTICROP HARVESTING

(71) Applicant: DEERE & COMPANY, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 303 days.

(21) Appl. No.: 16/854,606

(22) Filed: Apr. 21, 2020

(65) Prior Publication Data

US 2021/0321565 A1    Oct. 21, 2021

(51) Int. Cl.
| | | |
|---|---|---|
| *A01D 41/06* | (2006.01) | |
| *A01D 61/02* | (2006.01) | |
| *A01D 41/12* | (2006.01) | |
| A01D 41/02 | (2006.01) | |
| A01D 41/127 | (2006.01) | |
| A01D 61/00 | (2006.01) | |
| A01F 12/18 | (2006.01) | |
| B65G 33/22 | (2006.01) | |
| A01B 69/04 | (2006.01) | |

(52) U.S. Cl.
CPC ......... *A01D 41/06* (2013.01); *A01D 41/1217* (2013.01); *A01D 61/02* (2013.01); *A01B 69/008* (2013.01); *A01D 41/02* (2013.01); *A01D 41/12* (2013.01); *A01D 41/127* (2013.01); *A01D 41/1208* (2013.01); *A01D 41/1271* (2013.01); *A01D 61/008* (2013.01); *A01F 12/18* (2013.01); *B65G 33/22* (2013.01)

(58) Field of Classification Search
CPC ........ A01D 41/06; A01D 61/02; A01D 41/02; A01D 41/12; A01D 41/127; A01D 41/1271; A01D 61/008; A01D 41/14; A01D 41/1208; A01D 41/1217; A01F 12/18; B65G 33/22; A01B 69/001; A01B 69/008

See application file for complete search history.

(56) References Cited

U.S. PATENT DOCUMENTS

| | | | | |
|---|---|---|---|---|
| 2,001,078 A | * | 5/1935 | Court | A01D 46/12 56/16.5 |
| 2,544,411 A | * | 3/1951 | Altgelt | A01D 46/12 56/34 |
| 3,174,266 A | * | 3/1965 | Hoeksema | A01D 45/021 56/106 |
| 3,452,885 A | * | 7/1969 | Lloyd | A01D 41/1217 198/674 |

(Continued)

FOREIGN PATENT DOCUMENTS

| | | | | |
|---|---|---|---|---|
| CN | 113228931 A | * | 8/2021 | ............ A01D 45/22 |
| CN | 113767752 A | * | 12/2021 | ............ A01D 41/06 |

(Continued)

OTHER PUBLICATIONS

Flexifinger Product Brochure, pp. 1-8.

(Continued)

*Primary Examiner* — Arpad F Kovacs

(57) ABSTRACT

Compound headers may include two or more crop harvester types that are operable to harvest different crops simultaneously, such as different crops grown in the same field in an intercropped relationship. The simultaneously harvested crops may be separated into individual crop flows that are handled separately from each other.

17 Claims, 4 Drawing Sheets

(56) References Cited

U.S. PATENT DOCUMENTS

| | | | | |
|---|---|---|---|---|
| 3,503,196 | A * | 3/1970 | Jarrett | A01D 45/26 56/327.1 |
| 5,664,402 | A * | 9/1997 | Sandvik | A01F 12/50 53/391 |
| 6,295,796 | B1 * | 10/2001 | Raup | A01D 45/02 56/61 |
| 6,564,535 | B1 * | 5/2003 | Nafziger | A01D 61/008 198/666 |
| 6,848,243 | B2 * | 2/2005 | Carr | A01D 41/1208 56/10.2 R |
| 7,240,471 | B2 | 7/2007 | Mossman | |
| 7,318,310 | B2 * | 1/2008 | Kincaid | A01D 41/12 56/16.5 |
| 7,681,383 | B2 * | 3/2010 | Argetsinger | A01D 41/127 56/14.6 |
| 7,681,388 | B1 | 3/2010 | Hinds et al. | |
| 8,549,828 | B2 | 10/2013 | Burger | |
| 8,671,615 | B2 * | 3/2014 | Kumar | A01G 22/15 47/58.1 R |
| 9,011,222 | B2 * | 4/2015 | Johnson | A01F 12/444 460/1 |
| 9,554,517 | B2 * | 1/2017 | Johnson | B65G 33/22 |
| 9,907,230 | B2 | 3/2018 | Herringshaw et al. | |
| 10,321,628 | B2 | 6/2019 | Borry et al. | |
| 2006/0046801 | A1 * | 3/2006 | Argetsinger | A01D 41/127 460/59 |
| 2007/0033913 | A1 * | 2/2007 | Kincaid | A01D 41/12 56/16.5 |
| 2007/0186530 | A1 * | 8/2007 | Meier | A01D 41/1271 56/14.6 |
| 2010/0012467 | A1 * | 1/2010 | Goers | A01D 41/1217 198/618 |
| 2013/0102369 | A1 * | 4/2013 | Johnson | A01D 61/008 56/122 |
| 2016/0316626 | A1 * | 11/2016 | Bertino | A01F 7/06 |
| 2017/0188512 | A1 * | 7/2017 | Fromm | A01F 12/50 |
| 2018/0014462 | A1 * | 1/2018 | Borry | A01D 41/142 |
| 2018/0263198 | A1 * | 9/2018 | Bertino | A01D 41/02 |

FOREIGN PATENT DOCUMENTS

| | | | | |
|---|---|---|---|---|
| DE | 102016121703 A1 * | 5/2017 | | A01D 41/1208 |
| WO | WO-2016055049 A2 * | 4/2016 | | A01D 41/06 |

OTHER PUBLICATIONS

N. Iqbal et al., Comparative analysis of maize-soybean strip intercropping systems, Plant Production Science, Oct. 12, 2018, pp. 131-142, [online] Retrieved from the Internet <URL: https://www.tandfonline.com/action/journalInformation?journalCode=tpps20><DOI:10.1080/1343943X.2018.1541137>.

Muhammad Ali Raza et al., Effect of planting patterns on yield, nutrient accumulation and distribution in maize and soybean under relay intercropping systems, Scientific Reports, Mar. 20, 2019, pp. 1-14 <DOI: 10.1038/s41598-019-41364-1>.

Ward et al., Potential Profitability of Strip Intercropping with Corn and Soybeans, 2016 Journal of the ASFMRA, pp. 149-166.

Hempflax Double Cut Combine Brochure, pp. 1-3.

Hempflax, John Deere T660i Double Cut Combine, YouTube, [online] Retrieved from the Internet <URL: https//www.youtube.com/watch?v=AKUCvqppy8>, Sep. 3, 2019.

Hemp Harvester, YouTube, [online] Retrieved from the Internet <URL: https://www.youtube.com/watch?v=nzqflqcSvYQ>, Jun. 15, 2018.

Screen capture of Almaco Commercial Split Harvesters CR/TR, pp. 1.

Almaco Operator Manual, pp. 1-113.

* cited by examiner

MULTICROP HARVESTING

FIELD OF THE DISCLOSURE

The present disclosure relates generally to systems and apparatuses for multicrop harvesting.

BACKGROUND OF THE DISCLOSURE

Multiple cropping or multicropping is the practice of growing two or more crops in the same field during a single growing season. Growing multiple crops together at the same field can provide mutual benefits to the different plant species. For example, one crop may repel some pests that may be troublesome to another of the plant species being intercropped. Also, multicropping can reduce crop production materials and, therefore, associated production costs. For example, multicropping can reduce an amount of fertilizer or pesticide used.

SUMMARY OF THE DISCLOSURE

A first aspect of the present disclosure is directed to a combine harvester. The combine harvester may include a body portion; a feeder house extending from the body portion; and a compound header coupled to the feeder house. The compound header may include a first crop harvester type and a second crop harvester type laterally arranged relative to the first crop harvester type.

A second aspect of the present disclosure is directed to a compound header for a combine harvester. The compound header may include a first crop harvester type and a second crop harvester type different from the first crop harvester type, the first crop harvester type and the second crop harvester type being laterally arranged relative to each other.

The different aspects may include one of more of the following features. The first crop harvester type may be different from the second crop harvester type. The first crop harvester type and the second crop harvester type may have equal widths. The first crop harvester type and the second crop harvester type may have unequal widths. The first crop harvester type may form a first crop flow of a first harvested crop; the second crop harvester type may form a second crop flow of a second harvested crop, and the first crop flow and the second crop flow may be isolated from each other. Processing equipment may be disposed in the body portion, and the first crop flow may be transported to the processing equipment. The second crop flow may be offloaded from the combine harvester in an unprocessed condition. The second crop flow may be offloaded from the compound header. The second crop flow may be offloaded from the header to a vehicle. The second crop flow may be offloaded onto the ground. The second crop flow may be transported through the body portion prior to being offloaded from the combine harvester.

The various aspects may also include one or more of the following features. The first crop harvester type may include a first crop conveyor, and the second crop harvester type may include a second crop conveyor. The first crop conveyor may be laterally offset from the second crop conveyor. The first crop conveyor may be at least partially longitudinally offset from the second crop conveyor. A first offloading location may be associated with the first crop conveyor, and a second offloading location may be associated with the second crop conveyor. The first offloading location may be located laterally adjacent to the first crop conveyor, and the second offloading location may be located longitudinally adjacent to the second crop conveyor. The first crop conveyor may be an auger, and the second crop conveyor may be an endless belt. The lateral arrangement of the first crop harvester type and the second crop harvester type may include the first crop harvester type being divided by the second crop harvester type. The first crop harvester type may include a first crop conveyor; the second crop harvester type may include a second crop conveyor; and the first crop conveyor may be longitudinally offset from the second crop conveyor. The first crop harvester type may include a corn harvester, and the second crop harvester type may include a reel harvester.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
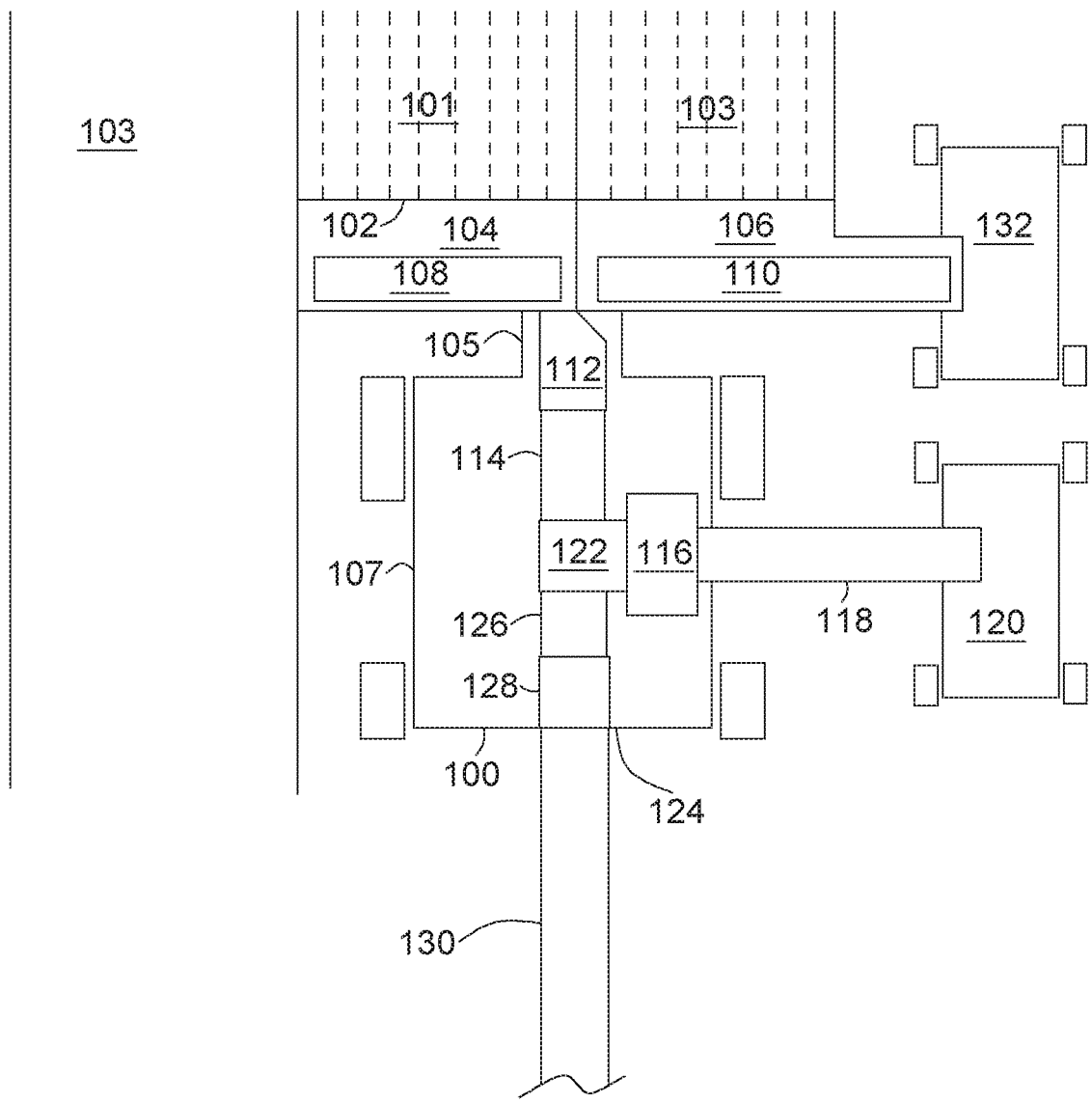
FIG. 1 is a schematic view of an example multicrop combine harvester that harvests two separate crops simultaneously, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and apparatuses for harvesting multicropped fields or other areas in which more two or more different crops are being grown together, e.g., intercropping, during a growing season. In addition to the potential cost saving and benefits associated with multicropping, e.g., reduced pesticide, herbicide, and fungicide usage and associated costs and the useful symbiotic relationships between some plants, increased crop per area yield may also be realized.

FIG. 1 is a schematic of an example multicrop combine harvester 100 that harvests two separated crops simultaneously. The combine harvester 100 harvests two different crops 101 and 103, producing separate crop flows in a multicrop compound header 102 coupled to the combine harvester 100. In the illustrated example, each of the different crops 101 and 103 are arranged in segregated groups that are disposed adjacent to each other. In some implementations, the segregated groups may be arranged in a plurality of rows. Although the example shown in FIG. 1 shows that each group of crops 101 and 103 occupy approximately half of the width of the header 102, in other implementations, the width of each group may vary. For example, in some implementations, the width of the group of one crop may be less than half of the total width of the header 102, e.g., one third or one quarter of the total width of the header 102. Correspondingly, for a dual crop multicropping scenario, the group width of the second crop may be two-thirds or three quarters of the width of the header 102, respectively. However, the scope is not so limited. Rather, in a multicrop scenario, a width of each of the crop groups may be selected to be any desired size. Further, the selected widths of the separate crops may be selected such that the combined width of the different crop groups conforms to an entirety or less than an entirety of the width of the header. Thus, for a multicrop scenario containing two crops provided in segregated groups, the width of the two groups may corresponds to an entirety of the header width or the combine width of the two groups of crops may be less than the entirety of the header width. Still further, in other implementations, multicropping may involve three or more crops arranged in segregated groups, and the combined widths of those crop groups may be equal to or less than a total width of the header.

The header 102 is coupled to a body portion 107 of the combine harvester 100. Particularly, the header 102 is coupled to a feeder house 105 of the combine harvester 100. The feeder house 105 extends from the body portion 107. As shown, the header 102 is a compound header that includes two separate crop harvester types. That is, the header 102 includes a first type of crop harvester 104, such as a corn header type of crop harvester, and a second type of crop harvester 106, such as a draper header type of crop harvester. The header 102 may contain any other type of crop harvester. For example, other header types may form part of the header 102, such as a grain header, a sunflower header, a cotton harvester row unit, a pick-up header, a flex platform header, and a dummy header. Other types of crop harvester technologies may also be incorporated into the header 102.

The different crop harvester types 104 and 106 are disposed laterally adjacent to each other. Although two different crop harvester types are shown, in other implementations, more than two types of crop harvester may be included in the header 102. For example, in some implementations, a compound header 102 may include three different crop harvester types laterally disposed relative to each other, and, in some instances, two of the crop harvester types may be the same. For example, in some cases, multicropping may involve three different types of crops, each crop type contained in separate, adjacent segments. Each segment may include one or more rows of the particular crop. In such instances, two of the crop types may use the same or similar type of crop harvester but the header 102 may prevent intermingling of the different crops by maintaining the different harvested crops in separate crop flows. In still other implementations, the header 102 may include four or more different types of crop harvesters.

In still other implementations, as described in more detail below, the header may include two different crop harvester types, and one of those crop harvester types may be interposed in the other crop harvester type. Thus, one crop harvester type may be divided by the other crop harvester type but otherwise form a unitary and integrated crop harvester type.

Crop harvested by the first crop harvester type 104 is transported by a first conveyor 108, and crop harvested by the second crop harvester type 106 is transported by a second conveyor 110. The first and second conveyors 108 and 110 may be any type of conveyor, such as one or more endless belts, one or more augers, powered rollers, chain-based conveyors, or another type of conveyor. For example, in other implementations, harvested crop may be conveyed via airflow.

In the illustrated example, the first and second conveyors 108 and 110 are laterally separated from each other. In some implementations, the first and second conveyors 108 and 110 may be, at least partially, longitudinally offset from each other. Thus, in some implementations, the first and second conveyors 108 and 110 may be both laterally separated from each other and at least partially longitudinally offset from each other.

A first crop flow produced by the first crop harvester type 104 is conveyed by conveyor 108 to the feeder house 105, where the crops 101 are deposited on a third conveyor 112 at an offloading location. The offloading location is longitudinally adjacent to the conveyor 108. The third conveyor 112 extends through the feeder house 105 and may be of any of the types of conveyor, as described earlier. The third conveyor 112 transfers the harvested crops into the body portion 107 and, particularly, to processing equipment 114 contained within the body portion 107. The processing equipment 114 includes equipment applicable to process the type of crop being harvested. For example, the processing equipment 114 may include a rotor and concave arrangement, threshing cylinder and straw walker arrangement, harvested material cleaner, chopper, crusher, baler, and bagger, among others. Upon completion of processing by the processing equipment 114, a first portion of the processed crops, e.g., the grains, are collected in a bin 116. The grains may be offloaded from the bin 116 by a fourth conveyor 118, such as a flighted belt, auger, airflow, or other conveyor type, to a vehicle 120. A fifth conveyor 122 may be used to transport the first portion of the processed crop 101 to the bin 116.

A second portion of the processed crop 101, e.g., stalk material or chaff, is expelled from the combine harvester 100 at a trailing end 124 thereof. In some implementations, the second portion of the processed crop 101 may be further process, such as by a chopper 126. In some implementations, the second portion of the processed crop 101 may be dispersed along the surface of the field by a spreader 128. In other implementations, the second portion of the processed crop 101 may be deposited on the surface of the field in a windrow 130.

Thus, the first crop flow produced by the first harvester type 104 of the header 102 is processed by the combine harvester 100. A second crop flow produced by the second harvester type 106 is not processed by the harvester but, rather, offloaded to a vehicle 132 via the second conveyor 110. The second crop flow is offloaded from the second conveyor 110 at an offloading location that is laterally adjacent to the second conveyor 110. In some implementations, the vehicle 132 may be a grain cart pulled by a tractor or truck. In other implementations, the vehicle 132 may be a self-propelled vehicle having a bin for collecting the offloaded grain. In still other implementations, the vehicle 132 may be a combine harvester that receives the offloaded harvested crop for further crop processing. In still other implementations, the second crop flow of crop 103 may be deposited onto the ground such as in the form of a windrow. The windrowed crop may then be collected and baled, for example.

Figure 2:
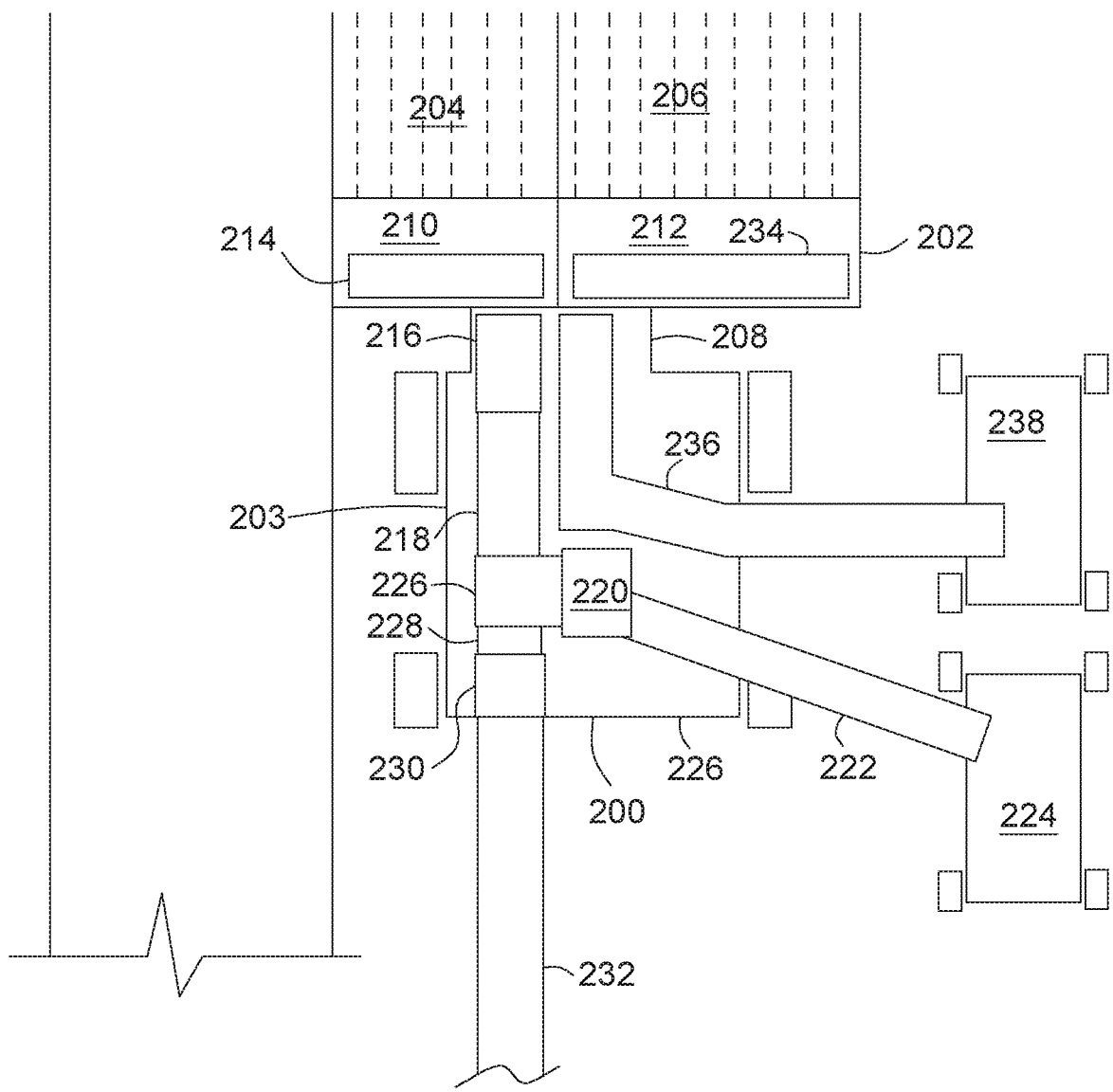
FIG. 2 is a schematic view of another example multicrop combine harvester that harvests two crops simultaneously, according to some implementations of the present disclosure.

FIG. 2 is a schematic of another example multicrop combine harvester 200 that harvests two separate crops simultaneously. The combine harvester 200 includes a multicrop compound header 202 coupled to a body portion 203 at a feeder house 208. The feeder house 208 extends from the body portion 203. The header 202 is operable to harvest two crops 204 and 206 at the same time. The two crops 204 and 206 are arranged in segregated groups, which may contain one or more rows of crops. In the illustrated example, the crop 204 defines a group that corresponds to one-third of a width of the header 202, and the crop 206 defines a group that corresponds to two-thirds of the width of the header 202. As explained above, the crops 204 and 206 may define groups that represent different amounts of the total width of the header 202. For example, a combined width of the groups of crops 202 and 204 may be less than an entire width of the header 202. In other implementations, a combined width of the groups of crops 202 and 206 may be equal to the width of the header 202. In still other implementations, the header 202 may include more than two harvester types, each harvester type being configured to harvest a different crop. Thus, in some implementations, the header 202 may be configured to simultaneously harvest more than two types of crops.

The combine harvester 200 harvests the two different crops 204 and 206 simultaneously, producing separate crop flows in the header 202. One of the crop flows corresponds to the first crop 204, and the second crop flow corresponds to the second crop 206. As shown, the header 202 is a compound header that includes two separate crop harvester types. That is, the header 202 includes a first type of crop harvester 210, such as a corn header type of crop harvester, that is configured to harvest the first crop 204 and a second type of crop harvester 212, such as a draper header type of crop harvester, that is configured to harvest the second crop 206. The header 202 may contain any type of crop harvester. Other header types may form part of the header 202, such as a grain header, a sunflower header, cotton header, a pick-up header, a flex platform header, and a dummy header. Other types of crop harvester technologies may also be incorporated into the header 202.

Crop 204 is harvested by first crop harvester type 210, and the crop 206 is harvested by the second crop harvester type 212. The first crop harvester type 210 may be sized to correspond to the width of the crop 204, and the second crop harvester type 214 may be sized to correspond to the width of the crop 206. For example, in the illustrated example, the crop 204 defines a group that is approximately one-third of the width of total with of the header 202, and crop 206 defines a group that is approximately two-thirds of the total width of the header 202. As a result, each of the crop harvester types 210 and 212 occupies one-third and two-thirds of the total width of the header 202, respectively. In other implementations, the crops 204 and 206 may have any desired width, and the respective crop harvester types 210 and 212 may be sized accordingly. Particularly, widths of the crop harvester types 210 and 212 may be selected to correspond to the respective widths of the crops 204 and 206. Further, the widths of the crops 204 and 206 may be equal to the total with of the header 202. In some implementations, the crop harvester types 210, 212 may occupy equal amounts of the header 202, while, in other implementations, the different crop harvester types 210, 212 may occupy different amounts of the header 202.

In some implementations, the header 202 may be divided such that the first crop harvester type 210 forms half of the header, and the second crop harvester type 212 forms half of the header. In other implementations, the amount of the header 202 occupied by the different harvester types 210 and 212 may be a 40 percent-60 percent split, a 30 percent-70 percent split, a 20 percent-80 percent split, a 10 percent-90 percent split, or any desired percentage split. In some instances, a header having harvester types occupying unequal portions of the header may allow for greater harvesting speeds than if the harvester types occupied equal portions of the header as a result of different yields between the different crops.

Although FIG. 2 shows a header 202 that is divided between two crop harvester types 210 and 212, other implementation within the scope of the present disclosure include headers having more than two crop harvester types. For example, in some implementations, a header may include three harvester types, four harvester types, or any number of desired harvester types. Further, the different harvester types included on the header may occupy equal portions of the header or unequal portions of the header.

The harvested crop 204 is received onto and transported to the feeder house 208 by a conveyor 214 of the first harvester type 210. The conveyor 214 may be of a type described above. For example, the conveyor 214 may be a more endless belts or one or more augers. The crop 204 is transferred from the conveyor 214 to a conveyor 216 at an offloading location. The conveyor 216 extends through the feeder house 208 and may be of any of the types of conveyor, as described earlier. The conveyor 216 transfers the harvested crops to processing equipment 218 contained within the body portion 203. The processing equipment 218 includes equipment applicable to process the type of crop being harvested. For example, the processing equipment 218 may include a rotor and concave arrangement, threshing cylinder and straw walker arrangement, harvested material cleaner, chopper, crusher, baler, and bagger, among others. Upon completion of processing by the processing equipment 218, a first portion of the processed crop 204, e.g., the grains, is collected in a bin 220. The first portion of the crop 204 may be offloaded from the bin 220 by a conveyor 222, such as a flighted belt, auger, airflow, or other conveyor type, to a vehicle 224. A conveyor 226 is used to transport the first portion of the processed crop 204 to the bin 220.

A second portion of the processed crop 204, e.g., stalk material or chaff, is expelled from the combine harvester 200 at a trailing end 226 thereof. In some implementations, the second portion of the processed crop 204 may be further process, such as by a chopper 228. Further, in some implementations, the second portion of the processed crop 204 may be dispersed along the surface of the field by a spreader 230. In other implementations, the second portion of the processed crop may be deposited on the surface of the field in a windrow 232.

The second harvester type 212 harvests the crop 206. The harvested crop 206 is received onto a conveyor 234 of the second harvester type 212. The conveyor 234 may be any type of conveyor, such as a type described above or otherwise within the scope of the present disclosure. The conveyor 234 transports the harvested crop 206 to the feeder house 208, where the harvested crop 206 is deposited on a conveyor 236 at an offloading location. The conveyor 236 may be a type of conveyor as described earlier or otherwise within the scope of the present disclosure. The conveyor 236 extends through the feeder house 208 and transports the harvested crop 206 through the feeder house 208 and the body portion 203 of the combine harvester 200. The conveyor 236 transports the harvested crop 206 to a vehicle 238 where the harvested crop 206 is offloaded. Thus, the harvested crop 206 is transported to and through the body portion 203 of the combine harvester 200 but is not processed. The unprocessed crop 206 is deposited in the vehicle 238. In some implementations, the conveyor 236 may be formed of a plurality of conveyors, whether of the same type of conveyor or different conveyor types. Further, in some implementations, the combine harvester may include another bin that is fed by the conveyor 236 or a portion of the conveyor 236. The bin may be used to provide a temporary holding area for the harvested crop 206, for example, when a vehicle for offloading the crop, such as vehicle 238, is unavailable to receive the harvested crop 206.

A benefit of the header 202 that conveys harvested crop 206 through the combine harvester 200 but that remains unprocessed is that the header 202 have a decreased weight than a header, such as header 102, that offloads harvested and unprocessed crop 103 directly to vehicle 132. As a result, the header 202 may have improved balance, thereby providing improved tilt control compared to header 102. The header 202, in combination with the combine 200, also provide the ability to temporarily store harvested but unprocessed crop while an offloading vehicle, such as vehicle 238, is unavailable. This allows harvesting to continue in the absence of an offloading vehicle for the harvested but unprocessed crop.

In some implementations, as shown in FIG. 2, the conveyors 216 and 236 are provided laterally adjacent to each other. In other implementations, the conveyors 216 and 236 may arranged vertically offset relative to each other. That is, in some implementations, one of the conveyors 216 and 236 may be positioned adjacent to and vertically offset from the other of the conveyors 216 and 236. For example, one of the conveyors 216 and 236 may be positioned above the other of the conveyors 216 and 236. Further, the conveyors 216 and 236 may be arranged in a common feeder house, such as feeder house 208, while, in other implementations, each of the conveyors 216 and 236 may be provided in a separate feeder house. The feeder house may be arranged such that the conveyors 216 and 236 are vertically stacked or arranged such that the conveyors 216 and 236 are laterally offset from each other. Where separate feeder houses are used, the separate feeder houses may be arranged similarly.

The vehicles 224 and 238 may be a truck having a storage bin or another type of vehicle to receive the harvested crop, whether processed or unprocessed. For example, the vehicles 224 and 238 may include a tractor pulling a grain cart. In other implementations, the vehicles 224 and 238 may form parts of a vehicle train. For example, in some implementations, the vehicles 224 and 238 may be grain carts that are coupled together and transported via a truck or tractor. In other implementations, one of the vehicles 224 or 238 may be a tractor or truck that includes a storage bin and the other of the vehicles 224 or 238 may be a grain cart pulled by the truck or tractor. Thus, the vehicles 224 and 238 may be coupled such that both crops 204 and 206 are offloaded onto a common transport.

As shown in FIG. 2, in some implementations, the conveyors 214 and 234 may be laterally separated from each other. In other implementations, the conveyors 214 and 234 may be at least partially longitudinally offset from each other. Further, in some implementations, a discharge location of one of the conveyors 214 and 234 may be vertically offset from a discharge location of the other of the conveyors 214 and 234.

Although FIGS. 1 and 2 show the different conveyors as individual conveyors, in other implementations, one or more of the conveyors may be a collection of two or more conveyors. A conveyor that is a collection of conveyors, the collection of conveyors may contain conveyors having different types. The different types of conveyors may be of any type described herein or otherwise within the scope of the present disclosure.

Figure 3:
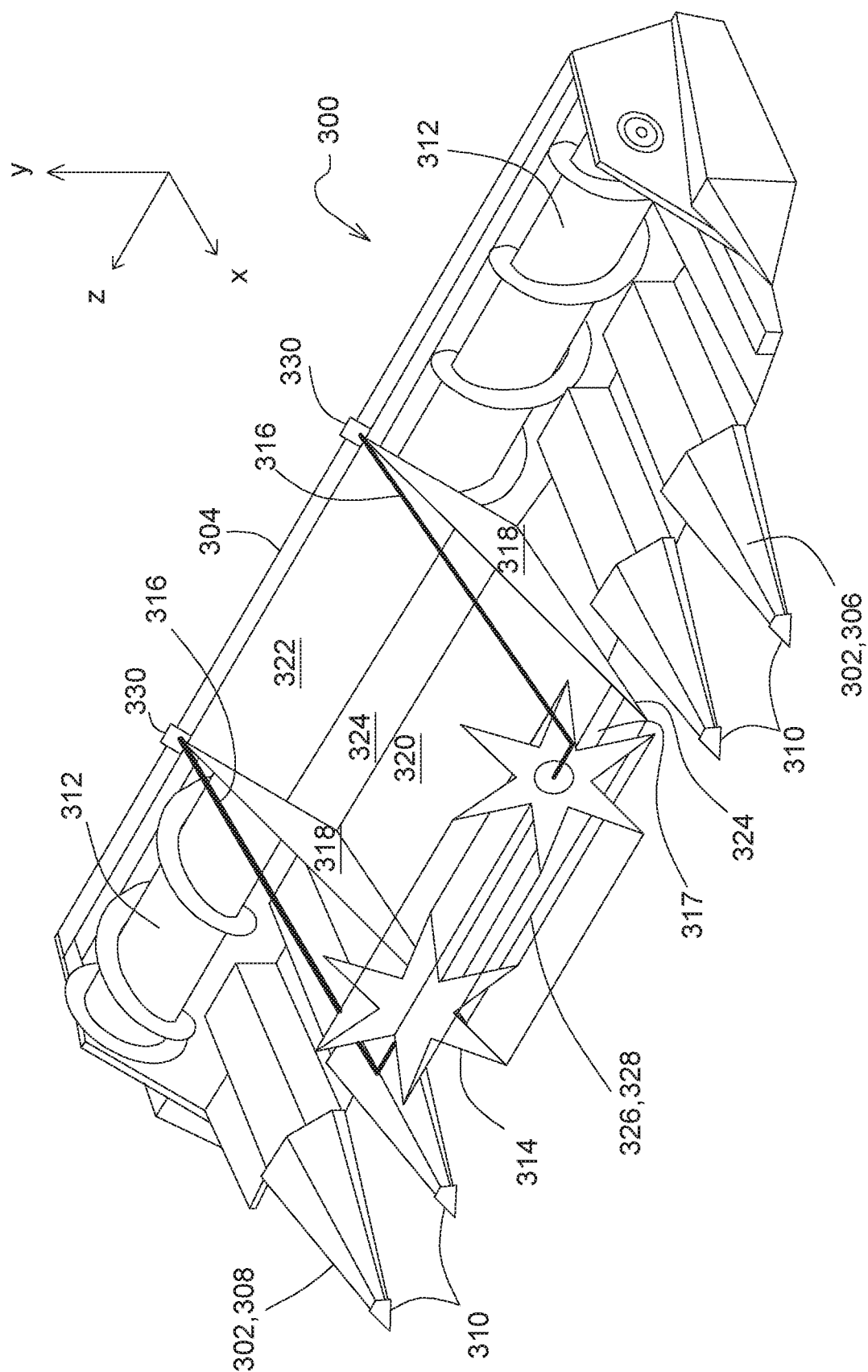
FIG. 3 is a perspective view of an example multicrop compound header that includes two different crop harvester types that are configured to harvest two different crops simultaneously, according to some implementations of the present disclosure.
Figure 4:
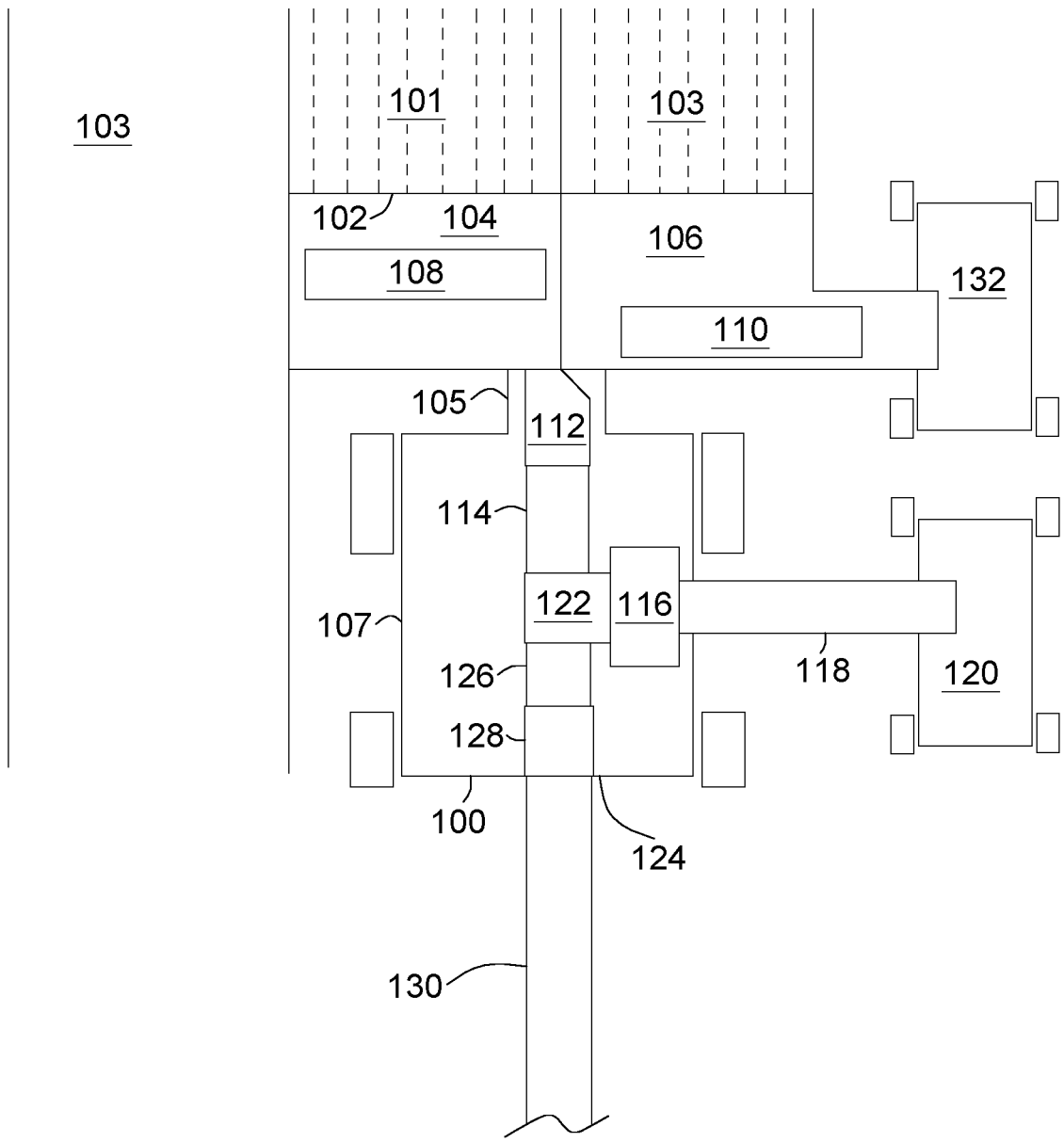
FIG. 4 is a schematic view of another example multicrop harvester where a first and second conveyors may be both laterally separated from each other and at least partially longitudinally offset from each other.

FIG. 3 is a perspective view of an example multicrop compound header 300. The header 300 includes a first crop harvester type 302 for harvesting a first crop and a second crop harvester type 304 for harvesting a second crop. The second crop harvester type 304 divides the first crop harvester type 302 into two portions 306 and 308. In the illustrated example, the first crop harvester type 302 is a corn harvester that includes four corn row units 310 that provides simultaneous harvesting of four rows of corn. In other implementations, additional or fewer corn row units may be included. The first crop harvester type 302 also includes a conveyor 312. In the illustrated example, the first conveyor 312 is an auger that transports the first crop, e.g., corn, to a first delivery conveyor, for example. The conveyor 312 extends to both portions 306 and 308 of the first crop harvester type 302 and transports harvested crop from both portions 306 and 308 to the first delivery conveyor. The first delivery conveyor may be housed in the feeder house of a combine harvester. The first delivery conveyor transports the harvested first crop to, for example, a first processing system contained in a combine harvester; to a holding bin; to the ground, such as in the form of a windrow; or to a separate location, such as a vehicle located adjacent to the combine harvester.

In the illustrated example of FIG. 3, the second crop harvester type 304 is a soybean harvester. The second crop harvester 304 includes a reel 314 located at end of arms 316, a floor 317, side walls 318, a second conveyor 320 located adjacent to the floor 317, an end wall 322, and an opening 324 formed in the end wall 322. A cutter 326 is located at a leading edge 328 of the floor 317 and cuts the incoming second crop. The second crop harvester type 304 also includes actuator systems 330. The actuator systems 330 are operable to actuate the reel 314 and the arms 316. For example, the actuator systems 330 are used to alter a height of the reel 314 above the ground (e.g., by pivoting the arms 316 to raise and lower the reel 314), extend or retract the arms 316 to extend or retract the reel 314, rotate the reel 314, and alter a rotational speed of the reel 314.

Crop harvested by the second crop harvester type 304 is received onto the second conveyor 320, which transports the harvested second crop into the opening 324. A second delivery conveyor may receive the harvested second crop that passes through the opening 324. The second delivery conveyor may be included in the same feeder house of a combine harvester that houses the first delivery conveyor or a separate feeder house of the combine harvester. The second delivery conveyor transports the harvested second crop to, for example, a second processing system contained in a combine harvester; to a holding bin that may be separate from a holding bin used to house the harvested first crop; to the ground, such as in the form of a windrow; or to a separate location, such as a vehicle located adjacent to the combine harvester.

As an example, a combine harvester having a header with a 30-foot (ft) (9.1 meters (m)) width may be configured for use in simultaneous harvesting of corn and wheat that are intercropped. In this example, the first processing system may be a rotor-based processing system for processing corn and may be sized for 12 header feet (3.6 m) of 250 bushel per acre (bu/ac) (15,723 kilograms per hectare (kg/ha)) corn; the second processing system may be a straw-walker processing system and may be sized for 18 header feet (5.5 m) of 60 bu/ac (4020 kg/ha) wheat; and the combine harvester may be operating at a six miles per hour (mi/h) (9.7 kilometers per hour (km/h)) harvesting speed. It is noted that the 12 header feet associated with corn processing and the 18 header feet associate with wheat processing combine to equal the width of the header, i.e., 30 feet (9.1 m). This example is provided merely as an example within the scope of the present disclosure. Further, the scope of the present disclosure is not intended to be or is to be limited to this example.

In some instances, the first and second processing systems may be of different types or of different capacities to improve combine material throughput or efficiency. In some implementations, the combine harvester may deposit both the harvested first crop and the harvested second crop in separate windrows along the ground. Further, in some implementations, the harvested first crop and the harvested second crop may be deposited into a separate vehicles which may be located adjacent to the combine harvester. Further, one or both of the harvested first crop and the harvested second crop may be unprocessed, partially processed, or fully processed by the combine harvester prior to being offloaded, such as by being deposited in one or more vehicles.

As shown in FIG. 3, the first crop harvester type 302 is divided by the second crop harvester type 304 such that the second crop harvester type 304 is interposed between the portions 306 and 308 of the first crop harvester type 302. In other implementations, as explained above, a first crop harvester type and a second crop harvester type provided on a header may be provided in a lateral arrangement such that the first crop harvester type is located laterally adjacent to the second crop harvester type in a side-by-side arrangement. In a side-by-side arrangement, the first and second crop harvester types may occupy equal portions of the header or unequal portions of the header, as explained earlier. In still other implementations, the header may include more than two crop harvester types. For example, in some implementations, the header may include three or more laterally arranged crop harvester types, each being operable to harvest a different crop type. The different crop types may be arranged in adjacent rows or groups of adjacent rows. Thus, the different crops may be provided in an intercropping arrangement.

Further, each crop harvested by the header containing multiple crop harvester types produces a separate crop flow. One or more of the produced crop flows may be, for example: received into the combine harvester for processing; transported through at least a portion of the combine harvester without being processed; offloaded from the header, such as onto the ground in the form of a windrow or to an adjacent vehicle; or stored in a bin provided on the combine harvester in either a processed or unprocessed condition.

Without in any way limiting the scope, interpretation, or application of the claims appearing below, a technical effect of one or more of the example implementations disclosed herein is providing a header that is operable to harvest two or more different crop simultaneously while maintaining separation of the different crops. Such a header allows for simultaneous harvesting of multicropped fields.

While the above describes example implementations of the present disclosure, these descriptions should not be viewed in a limiting sense. Rather, other variations and modifications may be made without departing from the scope and spirit of the present disclosure.

What is claimed is:

1. A combine harvester comprising:
   a body portion;
   a feeder house extending from the body portion; and
   a compound header coupled to the feeder house, the compound header comprising:
   a first crop harvester type; and
   a second crop harvester type laterally arranged relative to the first crop harvester type,
   wherein the first crop harvester type is different from the second crop harvester type,
   wherein an entirety of the first crop harvester type is laterally adjacent to at least a portion of the second crop harvester type,
   wherein the first crop harvester type includes a chain-based conveyor, and
   wherein the second crop harvester type includes an endless belt.

2. The combine harvester of claim 1, wherein the first crop harvester type and the second crop harvester type have equal widths.

3. The combine harvester of claim 1, wherein the first crop harvester type and the second crop harvester type have unequal widths.

4. The combine harvester of claim 1, wherein the first crop harvester type forms a first crop flow of a first harvested crop, wherein the second crop harvester type forms a second crop flow of a second harvested crop, and wherein the first crop flow and the second crop flow are isolated from each other.

5. The combine harvester of claim 4, further comprising processing equipment disposed in the body portion, wherein the first crop flow is transported to the processing equipment.

6. The combine harvester of claim 4, wherein the second crop flow is offloaded from the combine harvester in an unprocessed condition.

7. The combine harvester of claim 4, wherein the second crop flow is offloaded from the compound header.

8. The combine harvester of claim 7, wherein the second crop flow is offloaded from the header to a vehicle.

9. The combine harvester of claim 7, wherein the second crop flow is offloaded onto the ground.

10. The combine harvester of claim 6, wherein the second crop flow is transported through the body portion prior to being offloaded from the combine harvester.

11. A compound header for a combine harvester, the compound header comprises:
    a first crop harvester type; and
    a second crop harvester type different from the first crop harvester type, the first crop harvester type and the second crop harvester type being laterally arranged relative to each other, wherein an entirety of the first crop harvester type is laterally adjacent to at least a portion of the second crop harvester type,
    wherein the first crop harvester type includes a chain-based conveyor, and
    wherein the second crop harvester type includes an endless belt.

12. The compound header of claim 11, wherein the chain-based conveyor is laterally offset from the endless belt.

13. The compound header of claim 11, wherein the chain-based conveyor is at least partially longitudinally offset from the endless belt.

14. The compound header of claim 11, further comprising a first offloading location associated with the chain-based conveyor and a second offloading location associated with the endless belt, wherein the first offloading location is located laterally adjacent to the chain-based conveyor, and wherein the second offloading location is located longitudinally adjacent to the endless belt.

15. The compound header of claim 11, wherein the lateral arrangement of the first crop harvester type and the second crop harvester type comprises the first crop harvester type being divided by the second crop harvester type.

16. The compound header of claim 11, wherein the first crop harvester type comprises a harvester comprising row units and wherein the second crop harvester type comprises a reel harvester.

17. The compound header of claim 16, wherein the reel harvester comprises:
- a reel;
- at least one arm, the reel located at an end of the at least one arm; and
- an actuator system configured to at least one of alter a height of the reel above the ground, extend the reel, retract the reel, and alter a rotational speed of the reel.

\* \* \* \* \*